(12) United States Patent
Chu et al.

(10) Patent No.: US 9,954,701 B2
(45) Date of Patent: Apr. 24, 2018

(54) BLUETOOTH SIGNAL RECEIVING METHOD AND DEVICE USING IMPROVED PACKET DETECTION AND SYMBOL TIMING ACQUISITION

(71) Applicant: ABOV SEMICONDUCTOR CO., LTD., Cheongju, Chungcheongbuk-Do (KR)

(72) Inventors: Sang Young Chu, Gyeonggi-do (KR); Ki Tae Moon, Seoul (KR); Suk Kyun Hong, Seoul (KR)

(73) Assignee: ABOV SEMICONDUCTOR CO., LTD., Cheongju, Chungcheongbuk-do (KR)

( * ) Notice: Subject to any disclaimer, the term of this patent is extended or adjusted under 35 U.S.C. 154(b) by 0 days.

(21) Appl. No.: 15/390,432

(22) Filed: Dec. 23, 2016

(65) Prior Publication Data

US 2017/0195152 A1 Jul. 6, 2017

(30) Foreign Application Priority Data

Dec. 30, 2015 (KR) .................. 10-2015-0189879

(51) Int. Cl.
*H03D 3/00* (2006.01)
*H04L 27/14* (2006.01)
(Continued)

(52) U.S. Cl.
CPC .......... *H04L 27/148* (2013.01); *H04L 27/156* (2013.01); *H04L 27/22* (2013.01);
(Continued)

(58) Field of Classification Search
CPC . H04L 27/14; H04L 27/1563; H04L 27/1525; H04L 27/142; H04L 27/144;
(Continued)

(56) References Cited

U.S. PATENT DOCUMENTS

| | | | | |
|---|---|---|---|---|
| 4,166,980 A | * | 9/1979 | Apostolos | H04L 27/0012 324/76.12 |
| 5,400,365 A | * | 3/1995 | Tulai | H04L 27/1566 375/334 |

(Continued)

FOREIGN PATENT DOCUMENTS

| | | |
|---|---|---|
| JP | 2006-109476 A | 4/2006 |
| JP | 4383445 B2 | 12/2009 |

(Continued)

*Primary Examiner* — James M Perez
(74) *Attorney, Agent, or Firm* — Mintz Levin Cohn Ferris Glovsky and Popeo, P.C.; Kongsik Kim; Colleen H. Witherell

(57) ABSTRACT

Disclosed herein are a Bluetooth signal receiving device and method for receiving a Bluetooth signal. The Bluetooth signal receiving device includes a discriminator circuit and a correlator circuit. The discriminator circuit generates a baseband signal by performing frequency shift demodulation on a received signal, and generates a frequency proportion signal having a value proportional to the frequency of the baseband signal. The correlator circuit detects a packet assigned to the Bluetooth signal receiving device by comparing the frequency proportion signal with an access address received from a link layer. The Bluetooth signal receiving device may detect a packet, assigned to the Bluetooth signal receiving device itself, by using access address information of a link layer.

11 Claims, 11 Drawing Sheets

(51) Int. Cl.
　　 *H04L 27/148* (2006.01)
　　 *H04L 27/22* (2006.01)
　　 *H04W 4/00* (2018.01)
　　 *H04L 27/156* (2006.01)
　　 *H04W 8/26* (2009.01)

(52) U.S. Cl.
　　 CPC ............. *H04W 4/008* (2013.01); *H04W 4/80* (2018.02); *H04W 8/26* (2013.01)

(58) Field of Classification Search
　　 CPC ........ H03D 3/007; H04Q 1/46; A61B 5/0006; A61B 5/0015; G01S 7/352
　　 USPC ................. 375/259–285, 316–352, 354–376
　　 See application file for complete search history.

(56) References Cited

U.S. PATENT DOCUMENTS

| | | | | |
|---|---|---|---|---|
| 6,487,240 | B1* | 11/2002 | Chen | H04L 25/03178 329/318 |
| 6,642,797 | B1* | 11/2003 | Luo | H03J 7/045 329/300 |
| 6,751,273 | B1* | 6/2004 | Park | H04B 1/62 375/134 |
| 6,973,142 | B2* | 12/2005 | Chen | H04L 7/042 375/283 |
| 7,376,207 | B2* | 5/2008 | Chen | H04L 25/03178 370/252 |
| 7,570,717 | B2* | 8/2009 | Kim | H04L 27/066 375/326 |
| 7,639,762 | B2* | 12/2009 | Weizhong | H04L 25/03178 375/269 |
| 7,664,205 | B2* | 2/2010 | Wang | H04L 27/14 329/300 |
| 7,733,991 | B2* | 6/2010 | Ryter | H04L 25/062 375/272 |
| 8,401,120 | B1* | 3/2013 | Ozgur | H04L 1/00 375/329 |
| 8,411,797 | B2* | 4/2013 | Suissa | H04L 27/14 375/319 |
| 8,478,136 | B2* | 7/2013 | Hayee | H04B 10/2543 398/208 |
| 8,625,722 | B2* | 1/2014 | Rouquette | H04L 27/14 375/334 |
| 8,903,023 | B1* | 12/2014 | Wang | H04L 27/142 375/224 |
| 9,628,309 | B1* | 4/2017 | Luong | H04L 25/03057 |
| 9,634,877 | B2* | 4/2017 | Lafuente | H04L 27/3411 |
| 9,756,591 | B2* | 9/2017 | Wang | H04W 56/0035 |
| 9,825,791 | B2* | 11/2017 | Moon | H04L 27/14 |
| 9,831,902 | B2* | 11/2017 | Moon | H04B 1/16 |
| 2002/0075974 | A1* | 6/2002 | Mill | H04L 7/041 375/340 |
| 2003/0097601 | A1* | 5/2003 | Glas | H04L 27/1525 713/401 |
| 2004/0091031 | A1* | 5/2004 | Dodgson | H04L 23/02 375/222 |
| 2005/0108002 | A1* | 5/2005 | Nagai | G10L 19/0204 704/203 |
| 2005/0181729 | A1* | 8/2005 | Ibrahim | H03J 7/02 455/41.2 |
| 2005/0243952 | A1* | 11/2005 | Li | H04B 1/0003 375/343 |
| 2006/0067433 | A1* | 3/2006 | Wang | H04L 27/14 375/334 |
| 2006/0093079 | A1* | 5/2006 | Kim | H04L 25/062 375/344 |
| 2006/0193402 | A1* | 8/2006 | Lee | H04L 27/2014 375/336 |
| 2007/0047491 | A1* | 3/2007 | Dutta | H04W 36/32 370/331 |
| 2007/0248195 | A1* | 10/2007 | Lerner | H04L 7/042 375/343 |
| 2010/0211990 | A1* | 8/2010 | Hou | H04L 25/06 726/2 |
| 2010/0260291 | A1* | 10/2010 | Hou | H04L 27/0014 375/319 |
| 2011/0021142 | A1* | 1/2011 | Desai | H04W 8/005 455/41.2 |
| 2011/0319020 | A1* | 12/2011 | Desai | H04L 63/02 455/41.2 |
| 2013/0195229 | A1* | 8/2013 | Cheng | H04L 27/0014 375/343 |
| 2013/0272722 | A1* | 10/2013 | Hayee | H04B 10/2543 398/208 |
| 2014/0086125 | A1* | 3/2014 | Polo | H04W 52/0229 370/311 |
| 2014/0195609 | A1* | 7/2014 | Wise | H04L 65/403 709/204 |
| 2016/0014549 | A1* | 1/2016 | Jones | H04L 27/00 455/41.1 |
| 2016/0278036 | A1* | 9/2016 | Wang | H04W 4/008 |
| 2017/0005853 | A1* | 1/2017 | Lafuente | H03C 3/0925 |
| 2017/0195149 | A1* | 7/2017 | Moon | H04L 27/14 |
| 2017/0195150 | A1* | 7/2017 | Chu | H04B 7/26 |
| 2017/0195151 | A1* | 7/2017 | Chu | H04L 27/148 |
| 2017/0222794 | A1* | 8/2017 | Lafuente | H04L 7/0331 |

FOREIGN PATENT DOCUMENTS

| | | |
|---|---|---|
| JP | 2011-166209 A | 8/2011 |
| JP | 5454181 B2 | 3/2014 |
| KR | 1020010100573 A | 11/2001 |
| KR | 10-0339661 B1 | 5/2002 |
| KR | 10-0525002 B1 | 10/2005 |
| KR | 10-0544245 B1 | 1/2006 |
| KR | 1020100035726 A | 4/2010 |
| KR | 10-1000861 B1 | 12/2010 |
| KR | 10-1026407 B1 | 4/2011 |

\* cited by examiner

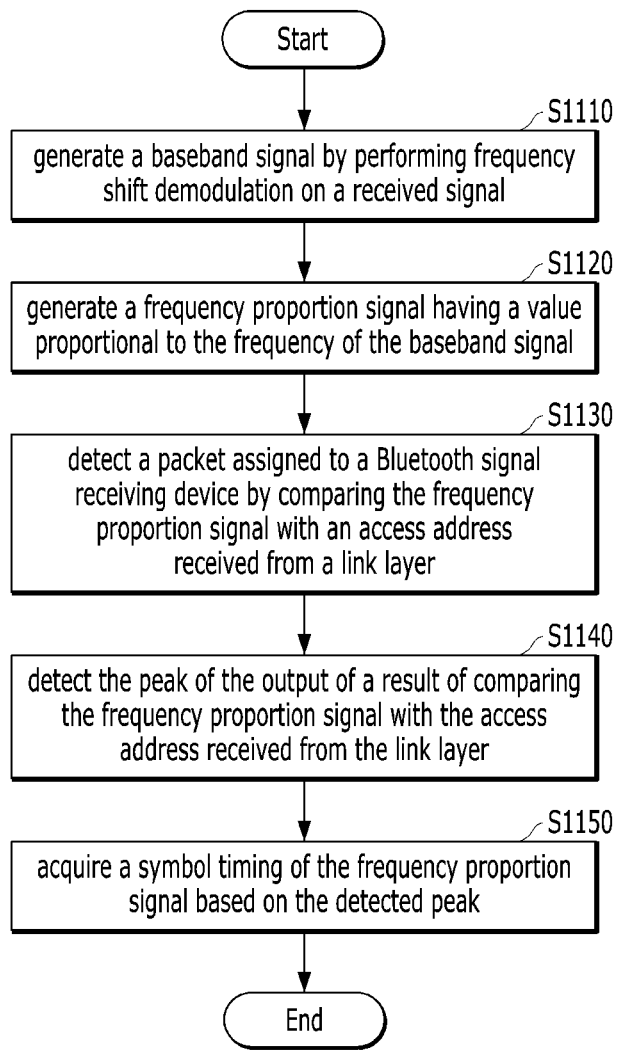

BLUETOOTH SIGNAL RECEIVING METHOD AND DEVICE USING IMPROVED PACKET DETECTION AND SYMBOL TIMING ACQUISITION

CROSS-REFERENCE TO RELATED APPLICATION

This application claims under 35 U.S.C. § 119(a) the benefit of Korean Patent Application No. 10-2015-0189879 filed on Dec. 30, 2015, which is incorporated herein by reference.

TECHNICAL FIELD

The present invention relates to technology for packet detection and symbol timing acquisition for a Bluetooth Smart receiving device, and more particularly to a device and method for constructing a high-sensitivity receiver that smoothly operates in a low signal-to-noise power ratio region through cooperation between a physical layer and a link layer in a Bluetooth Smart device.

The present invention was derived from the research conducted as a part of the Industrial Core Technology Development Project sponsored by the Korean Ministry of Trade, Industry and Energy and the Korea Institute of Industrial Technology Evaluation and Planning [Project Management Number: 10052626; Project Name: Development of BLE (Bluetooth Low-Energy) v4.2 Supporting Communication Semiconductor IP and Location Tracking SoC].

BACKGROUND ART

The configuration of a typical Bluetooth receiver is introduced in FIG. 1. Referring to FIG. 1, the Bluetooth receiver includes a front-end circuit 110 configured to obtain a baseband signal by demodulating a received signal, a filter 120 configured to selectively pass a desired channel therethrough and remove an undesired channel, and a recovery circuit 130 configured to convert the received baseband signal in the frequency domain into time domain symbols.

A Bluetooth transmitter generates a carrier frequency-based modulated signal by modulating a baseband signal. A Bluetooth Smart transmitter uses a Gaussian frequency shift keying modulation method that has a modulation index h ranging from 0.45 to 0.55. The frequency shift keying method refers to a method of transmitting digital information through the variation of the discrete frequency of a carrier.

FIG. 3 is a diagram showing the frequency characteristic of a modulated signal that is transmitted by a Bluetooth transmitter in an ideal environment in which noise and frequency offset are not present. Referring to FIG. 3, there are shown the minimum and maximum frequency shifts of a signal having a symbol transmission speed Fs of 1 Msps and a modulation index h of 0.5 that is transmitted via a carrier frequency Fc in the 2.4 GHz band. When the symbol transmission speed Fs is 1 Msps, the signal of the bit value "1" corresponding to the symbol "+1" has a frequency shift $F_+$ of +250 kHz (a frequency shift in a positive (+) direction) from a center frequency Fc, the signal of the bit value "0" corresponding to the symbol "−1" has a frequency shift $F_-$ of −250 kHz (a frequency shift in a negative (−) direction) from the center frequency Fc.

Referring back to FIG. 1, the front-end circuit 110 of the Bluetooth Smart receiver obtains a frequency-demodulated waveform in a baseband by using an analog or digital frequency demodulator, and estimates transmission bit information by deciding signs at symbol intervals.

Since a signal is received in the state in which the quality thereof has been degraded due to signal magnitude offset, carrier offset, timing offset, etc. attributable to mismatch between a transmitter and the receiver, the receiver must be prepared for errorless bit demodulation by implementing a recoverer for corresponding offset.

FIG. 2 is a diagram showing a typical packet of Bluetooth Smart. Referring to FIG. 2, the packet of Bluetooth Smart includes a preamble interval 210, an access address interval 220, a protocol data unit (PDU) interval 230, and a CRC interval 240. Since a Bluetooth receiver must identify an address during the access address interval 220 and must identify and process data during the PDU interval 230, preparation for the identification of the address and the data must be completed during the preamble interval 210. Accordingly, there is a time limitation in that operations, such as automatic gain control, frequency offset compensation, timing compensation, etc., must be performed within a preamble interval of Bluetooth or Bluetooth Smart in the front-end circuit 110 of the Bluetooth receiver.

For a receiver to estimate offset, a previously agreed upon pilot signal is required between a transmitter and the receiver. According to the Bluetooth Smart standard, a bit stream corresponding to the start of a packet is transmitted in the preamble interval 210. The bit stream of the preamble interval 210 is determined by the first transmission bit of the access address interval 220. When the first transmission bit of the access address interval 220 is "1," the bit stream value "01010101b" of the preamble interval 210 is transmitted. When the first transmission bit of the access address interval 220 "0," the bit stream value "10101010b" of the preamble interval 210 is transmitted.

When Bluetooth Classic has evolved to Bluetooth Smart, the specification of a modulation index has increased from the range of 0.28 to 0.35 to the range of 0.45 to 0.55 in order to increase coverage. The quality of a received signal is degraded due to increased coverage, and thus modifications have been made such that various types of offset can be more accurately estimated by increasing the length of a preamble from 4 μs to 8 μs accordingly. A differential discriminator is widely used to demodulate a Gaussian frequency shift signal with high sensitivity. The differential discriminator generates a signal that is proportional to the frequency of a received signal and that is proportional to a frequency shift based on carrier frequency.

Since the frequency-demodulated waveform of the preamble interval 210 frequency shift-modulated via the differential discriminator has a sine wave-like form in which negative (−) and positive (+) frequency shifts are repeated, it has a characteristic considerably appropriate for estimating symbol timing offset, and is appropriate for being used as a pilot signal.

An example of a preceding technology for compensating for the symbol timing offset of a received signal in a Bluetooth receiver is disclosed in U.S. Pat. No. 8,401,120 entitled "Symbol Error Acquisition for Bluetooth Enhanced Data Rate Packets."

The preceding technology corrects an error by performing CRC check, etc. when payload data is received. According to the preceding technology, when an error related to timing acquisition or the like is serious in a preprocessing process, it is difficult to recover the following data, such as payload or the like, and thus the importance of timing acquisition and compensation is emphasized.

The preceding technology is configured to detect a phase error by first acquiring an initial timing during a preamble interval and then monitoring changes in timing in the following payload interval. That is, the preceding technology is a technology configured to detect a phase error by comparing the phase of the output symbol of a symbol demodulator with the phase of a received signal, to provide notification that a current symbol timing is not reliable when the phase error exceeds a threshold value, and to compensate for a symbol timing error.

However, according to the preceding technologies, inter-symbol interference occurs due to a Gaussian filter used during the frequency shift keying process of the Bluetooth Smart standard, a frequency shift waveform is distorted, and the jitter of a timing error detector occurring due to the randomness of a data symbol in a payload interval causes a significant problem. Accordingly, in a current situation in which a demand for a high-sensitivity receiver supporting a value equal to or lower than −90 dBm is increasing, it is difficult to perform sufficient offset compensation on a Bluetooth Smart signal by using the conventional preceding technologies. Therefore, there is an increasing need for a means that is capable of dealing with this situation.

SUMMARY OF THE DISCLOSURE

The present invention relates to technology for packet detection and symbol timing acquisition for a Bluetooth Smart receiving device. An object of the present invention is to provide a device and method that detect a packet by using the received signal of an access address and address information obtained from a link layer and acquire a symbol timing.

The receiving sensitivity defined in the Bluetooth Smart standard is −70 dBm. In a −70 dBm received signal region compliant with the standard, received signal-to-noise power ratio corresponds to 30 dB or more, and thus the sensitivity of a received signal is considerably superior to that of a noise component. Accordingly, automatic gain control (AGC) and the estimation of various types of offset can be performed within a short period of time in the initial period of a preamble interval, and a packet can be detected within the remaining interval of the preamble interval. Furthermore, in the −70 dBm received signal region, a received signal-to-noise power ratio is high, and thus high-performance bit demodulation and decision calculation are not required, so that signal processing, such as a hard limiter, can be used. In this case, elaborate automatic gain control is not required, and thus the time assigned to packet detection can be relatively increased, so that it seems that there is no problem.

However, with the recent development of implementation technology, a demand for a −90 dBm or lower high-sensitivity receiver is increasing beyond the level of a receiving sensitivity of −70 dBm required by the standard. In a −90 dBm or lower signal magnitude region, received signal-to-noise power ratio is reduced to 10 dB or lower, and a correlation characteristic is also reduced due to noise having a relatively high magnitude. It is difficult to accurately perform all offset compensation calculation, such as automatic gain control, frequency offset estimation and symbol timing estimation, and packet detection calculation adapted to determine whether a packet is present merely in a short 8-μs preamble interval. Recently, there is a tendency to use a high-level post-processing process, such as maximum likelihood sequence estimation (MLSE), in order to increase the bit demodulation capability of a protocol data unit degraded by noise. When accuracy is decreased in a pre-processing process, such as offset compensation and packet detection, gain attributable to post-processing calculation cannot be expected.

Accordingly, to meet a demand for a high-sensitivity receiver for a Bluetooth signal, a method capable of increasing the accuracy of packet detection and symbol timing acquisition even in a low signal-to-noise power ratio environment is required.

The average value of white noise has the characteristic of converging to zero as the number of available samples increases. That is, according to the averaging characteristic of noise, as the number of samples used in calculation increases, noise is proportionally removed, so that a desirable correlation characteristic is obtained and packet detection performance is improved. An object of the present invention is to provide technology for increasing the accuracy of packet detection and symbol timing acquisition by significantly increasing sample time used to obtain a correlation characteristic.

An object of the present invention is to propose a new paradigm that departs from a conventional scheme of transferring a signal, particularly an access address bit stream, from a physical layer to a link layer and that transfers an access address bit stream, previously agreed upon between devices, from a link layer to a physical layer in advance in a reverse manner.

In order to achieve the above objects, a Bluetooth signal receiving device according to an embodiment of the present invention adopts a new paradigm that transfers a previously agreed upon access address bit stream from a link layer to a physical layer in advance. Furthermore, the physical layer detects a packet by using the access address bit stream, received from the link layer, for the calculation of a correlation with a received access address signal.

According to an aspect of the present invention, there is provided a Bluetooth signal receiving device for receiving a Bluetooth signal, the device including: a discriminator circuit (a differential discriminator circuit) configured to generate a baseband signal by performing frequency shift demodulation on a received signal and to generate a frequency proportion signal (an up-sampled signal) having a value proportional to the frequency of the baseband signal; and a correlator circuit configured to detect a packet assigned to the Bluetooth signal receiving device by comparing the frequency proportion signal with an access address received from a link layer. The Bluetooth signal receiving device may detect a packet, assigned to the Bluetooth signal receiving device itself, by using access address information of a link layer.

The Bluetooth signal receiving device may further include a timing acquisition circuit configured to acquire the symbol timing of the frequency proportion signal by detecting the peak of the output of the correlator circuit.

The Bluetooth signal receiving device may further include: a discrete time sampler circuit configured to sample the frequency proportion signal based on the symbol timing (the symbol timing acquired by the timing acquisition circuit); and a bit discriminator circuit configured to generate a plurality of series of bit streams based on the sampled values (the signs of the sampled signals) and to transfer the plurality of series of bit streams to the link layer.

The correlator circuit may be further configured to: generate an output value by comparing the frequency proportion signal with the access address received from the link layer; and recognize that the packet assigned to the Bluetooth signal receiving device has been received when the output value is equal to or larger than a threshold value.

The correlator circuit may include: a sign decision circuit configured to generate a first reference signal by deciding the signs of the frequency proportion signal (the up-sampled signal); memory configured to generate a second reference signal based on the access address received from the link layer; and an output circuit configured to generate a correlation output by performing logical operations on the first and second reference signals and summing results of the logical operations.

The access address received from the link layer may be the master-slave link address of the Bluetooth signal receiving device.

The correlator circuit may be further configured to detect the packet assigned to the Bluetooth signal receiving device by comparing the frequency proportion signal with the access address, received from the link layer, in the access address interval of Bluetooth.

According to another aspect of the present invention, there is provided a Bluetooth signal receiving method for a Bluetooth signal receiving device for receiving a Bluetooth signal, the method including: generating a baseband signal by performing frequency shift demodulation on a received signal; generating a frequency proportion signal (an up-sampled signal) having a value proportional to the frequency of the baseband signal; and detecting a packet assigned to the Bluetooth signal receiving device by comparing the frequency proportion signal with an access address received from a link layer.

The Bluetooth signal receiving method may further include: detecting the peak of the output of the result of comparing the frequency proportion signal with the access address received from the link layer; and acquiring the symbol timing of the frequency proportion signal based on the detected peak.

The detecting may include: generating an output value by comparing the frequency proportion signal with the access address received from the link layer; and recognizing that the packet assigned to the Bluetooth signal receiving device has been received when the output value is equal to or larger than a threshold value.

The detecting may include detecting the packet assigned to the Bluetooth signal receiving device by comparing the frequency proportion signal with the access address, received from the link layer, in the access address interval of Bluetooth.

BRIEF DESCRIPTION OF THE DRAWINGS

The above and other objects, features and advantages of the present invention will be more clearly understood from the following detailed description taken in conjunction with the accompanying drawings, in which:

FIG. 11 is an operation flowchart showing the packet detection and symbol timing acquisition process of a Bluetooth signal receiving method according to an embodiment of the present invention.

DETAILED DESCRIPTION OF THE DISCLOSURE

Embodiments of the present invention will be described in detail with reference to the accompanying drawings. In the following description of the present invention, a detailed description of a related well-known component or function will be omitted when it is determined that the detailed description may make the gist of the present invention obscure.

The prevent invention is not limited to the embodiments. Throughout the accompanying drawings, the same reference symbols designate the same components.

Figure 1:
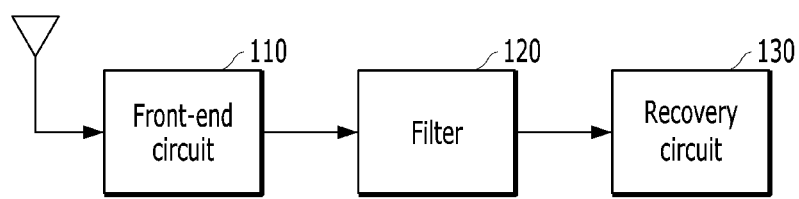
FIG. 1 is a block diagram showing the configuration of a typical Bluetooth receiver.
Figure 2:
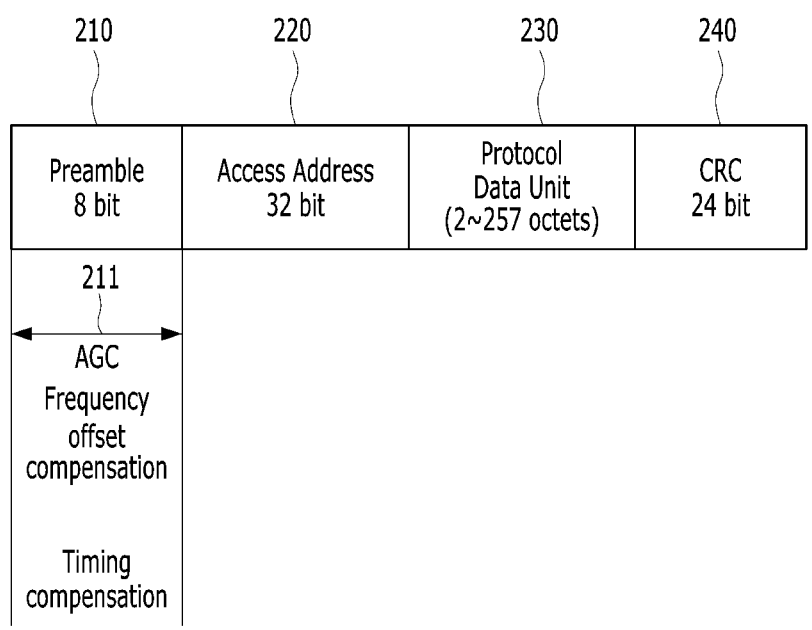
FIG. 2 is a diagram showing a typical packet of Bluetooth Smart.
Figure 3:
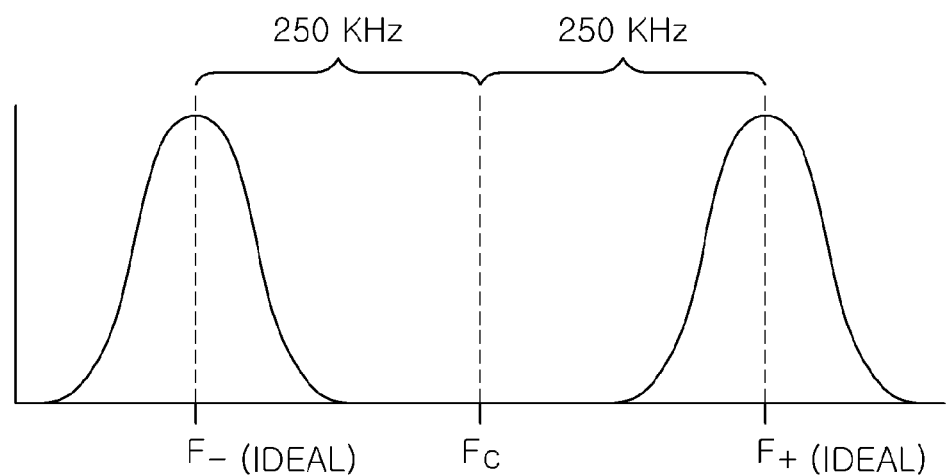
FIG. 3 is a diagram showing the frequency characteristic of a modulated signal that is transmitted by a Bluetooth transmitter in an ideal environment in which noise, frequency offset and symbol timing offset are not present.
Figure 4:
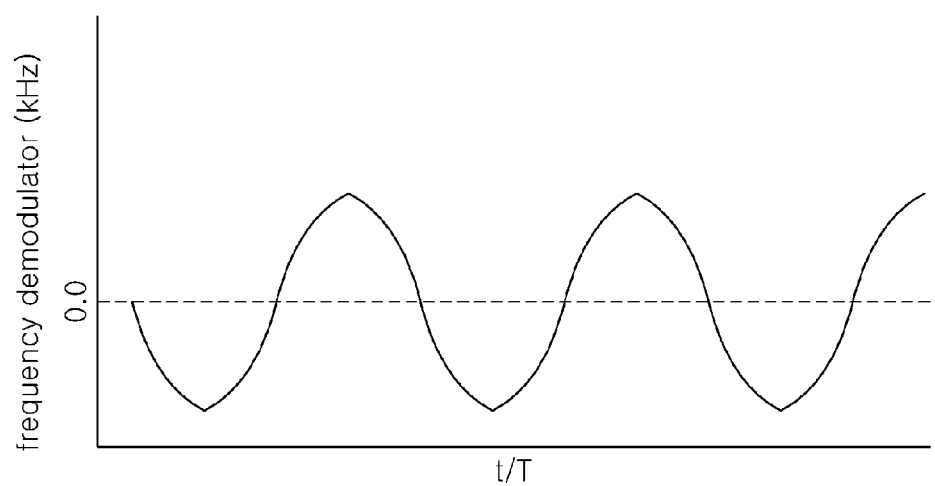
FIG. 4 is a diagram showing an example of the waveform of a preamble having passed through the frequency demodulator of a Bluetooth receiver.

FIG. 4 is a diagram showing an example of the waveform of a preamble 210 having passed through the frequency demodulator of a Bluetooth receiver.

As described above, in the preamble interval 210, when the first transmission bit of the access address interval 220 is "1," the signal "01010101b" is transmitted. When the first transmission bit of the access address interval 220 "0," the signal "10101010b" is transmitted.

In this case, the signal of the preamble 210 frequency-modulated via a differential discriminator appears in a sine wave-like form in which a negative (−) frequency shift and a positive (+) frequency shift are symmetrically repeated over 8 μs, as shown in FIG. 4.

Since Bluetooth Smart prioritizes costs and low power, it allows clock inaccuracy within the maximum range of +/−50 kHz in a packet in order to ease the level of analog circuit design specifications, and thus an optimum symbol timing varies in a packet interval. In order to implement a high-sensitivity receiver, a circuit and device having improved accuracy at which a packet is detected and an optimum symbol timing is obtained is required.

Figure 5:
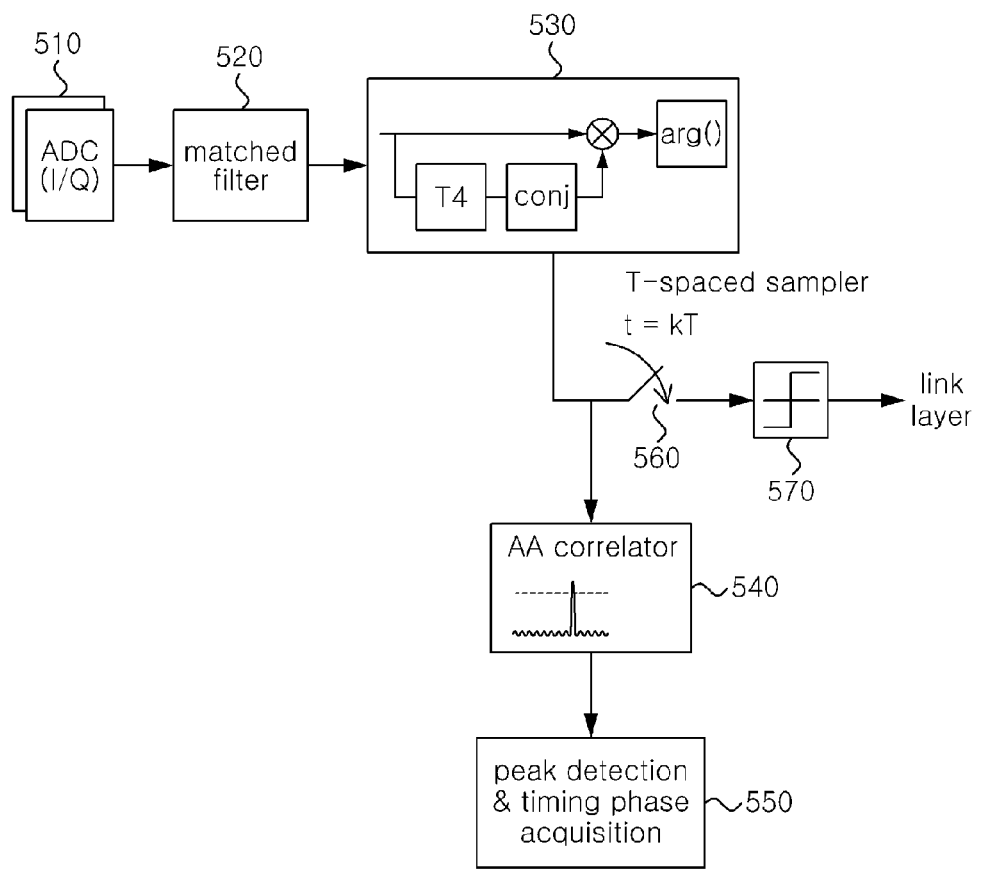
FIG. 5 is a diagram showing a Bluetooth signal receiving device according to an embodiment of the present invention.

Referring to FIG. 4, assuming that carrier frequency offset has been all compensated for, the waveform of a preamble is transmitted with a frequency shift in a positive (+) direction and a frequency shift in a negative (−) direction forming symmetry with respect to a frequency shift of 0.0 kHz. The frequency-demodulated waveform of the preamble forms a sine wave-like waveform, and thus initial symbol timing acquisition is performed to obtain the correlation between a previously determined preamble bit stream (prescribed in the Bluetooth standard) and a received signal (a waveform, such as that of FIG. 4) and to estimate a point at which a peak occurs as an optimum symbol timing. That is, the symbol timing acquisition does not cause a significant problem with accuracy even when a preamble receiving waveform, such as that shown in FIG. 5, is used. Thereafter, optimum symbol timing may be advanced or deferred due to clock inaccuracy, etc. during the access address interval 220, and the number of samples of the preamble interval 210 corresponding merely to 8 µs may cause difficulty in minimizing an error factor attributable to white noise in order to implement a high-sensitivity receiver.

The Bluetooth signal receiving device of the present invention may perform initial symbol timing acquisition during the access address interval 220 over 32 µs, and thus may acquire a symbol timing in the state of incorporating changes in optimum symbol timing during the access address interval 220 thereinto. An error factor attributable to white noise can be sufficiently removed by increasing the number of samples for symbol timing acquisition. As a result, the Bluetooth signal receiving device of the present invention can increase the accuracy of packet detection and symbol timing acquisition.

FIG. 5 is a diagram showing a Bluetooth signal receiving device according to an embodiment of the present invention.

Referring to FIG. 5, packet detection and symbol timing acquisition, which are performed in the Bluetooth signal receiving device of the present invention, are shown.

There is shown an ADC pair 510 configured to receive an I signal and a Q signal and convert an analog value into a digital value. The output of the ADC pair 510 passes through a matched filter 520, and is transferred to a differential discriminator 530. The differential discriminator 530 generates a frequency proportion signal (an up-sampled signal) having a value proportional to the frequency of a baseband signal.

The ADC pair 510 operates at a sampling speed (N times) higher than a Nyquist rate that is defined as a speed that is twice a symbol speed so that the digital signal can be demodulated. That is, the signal having passed through the matched filter 520 includes N samples per symbol. In greater detail, to smoothly recover a signal degraded due to noise, a clock error or the like, the ADC pair 510 is operated at an up-sampling time interval shorter than a symbol interval.

For example, since the symbol interval of the Bluetooth Smart standard is 1 µs and Nyquist sampling speed is twice symbol speed, the sampling time interval of an analog-digital converter may be designed to be less than 0.5 µs. In FIG. 5, for example, an ADC pair 510, a matched filter 520, and a differential discriminator 530 that operate at a 4-sample interval per symbol are shown.

Furthermore, a correlator circuit 540 and a bit discriminator 570 may also operate at a 4-sample interval per symbol in accordance with up-sampling time.

The correlator circuit 540 generates an output value by comparing the up-sampled frequency proportion signal with an access address bit stream received from a link layer. The output value is a correlation between the up-sampled frequency proportion signal and the access address bit stream received from the link layer. That is, the correlator circuit 540 may identify whether the up-sampled frequency proportion signal and the access address bit stream are actually identical to each other. When the output value of the correlation is equal to or larger than a threshold value, the correlator circuit 540 may recognize that a packet assigned to the Bluetooth signal receiving device itself has been received. The access address bit stream received from the link layer may be a master-slave link address.

The peak detection and timing phase acquisition circuit 550 may acquire the symbol timing of the up-sampled frequency proportion signal by detecting the peak of the output of the correlator circuit 540.

As described above, a signal having passed through the matched filter 520 includes N samples per symbol, and requires the acquisition of an optimum sample phase used for the demodulation of data bits. When a packet is detected by the operation of the correlator circuit 540, the location of the peak of the correlation output value is tracked by operating a timer over 1 symbol time from the time at which the packet is detected, and a found peak location is obtained as an optimum symbol timing phase when the timer is terminated and used to demodulate a protocol data unit 230 that is received thereafter.

The discrete time sampler circuit 560 may sample the up-sampled frequency proportion signal based on a symbol timing. In this case, the reference timing of the sampling may be a symbol timing obtained by the peak detection and timing phase acquisition circuit 550.

The bit discriminator circuit 570 may generate a plurality of series of bit streams based on values sampled by the discrete time sampler circuit 560 (based on the signs of sampled signals). In this case, the generated plurality of series of bit streams may be transferred to the link layer.

The correlator circuit 540 may detect a packet assigned to the Bluetooth signal receiving device itself by comparing the frequency proportion signal with the access address bit stream received from the link layer during the access address interval 230 of Bluetooth.

Figure 6:
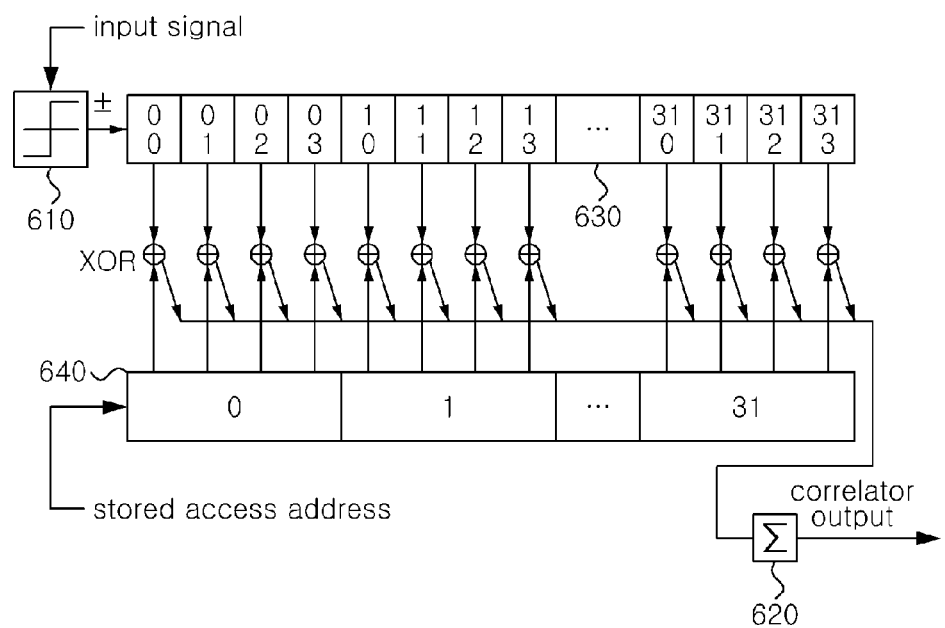
FIG. 6 is a diagram showing an example of the correlator circuit of a Bluetooth signal receiving device according to an embodiment of the present invention.

FIG. 6 is a diagram showing an example of the correlator circuit 540 of a Bluetooth signal receiving device according to an embodiment of the present invention.

Referring to FIG. 6, the correlator circuit 540 may include a sign decision circuit 610, a correlation output circuit 620, an FIFO register 630, and address memory 640. The correlator circuit 540 operates using the access address bit stream, received from the link layer, as a reference signal. The correlator circuit 540 may include a sign decision circuit 610 using the sign values of an input received signal, as shown in FIG. 6, in order to reduce the complexity of implementation and reduce the amount of computation.

The sign decision circuit 610 may generate a first reference signal by deciding the signs of up-sampled frequency proportion signals. The series of bit streams of the first reference signal may be sequentially stored in the FIFO register 630. In this case, an access address corresponds to 32 bits, the sign decision circuit 610 operates at a 4-sample interval per symbol, and thus the FIFO register 630 may store the 128 (=32 bits×4 samples) bit streams of the first reference signal in order to perform valid decision. The FIFO register 630 may operate in a First-In First-Out (FIFO) manner. The FIFO register 630 may store a number of identified bits equal to a predetermined number, and may evict the oldest bit when storing a new bit. As an example, the predetermined number may be 128, as shown in FIG. 6

The address memory 640 may receive an access address indicative of the Bluetooth signal receiving device itself from the link layer, and may store the access address. The address memory 640 has a space in which a 32-bit access address can be stored. The address memory 640 may generate a second reference signal based on the access address received from the link layer.

A logical operation, such as an exclusive OR (XOR) operation, may be performed between the bit streams of the first reference signal stored in the FIFO register 630 and the second reference signal provided from the address memory 640. In this case, the first reference signal has been upsampled at a 4-sample interval per symbol, and thus a comparator for comparing the first reference signal and the second reference signal may be designed by taking into account the up-sampling time interval.

The correlation output circuit 620 may generate a correlation output by performing logical operations on the first reference signal and the second reference signal and summing the results of the logical operations. The comparison between the up-sampled first and second reference signals enables the comparison between the received signal and the previously stored address bit streams in the state where a symbol timing has not been accurately obtained.

Figure 7:
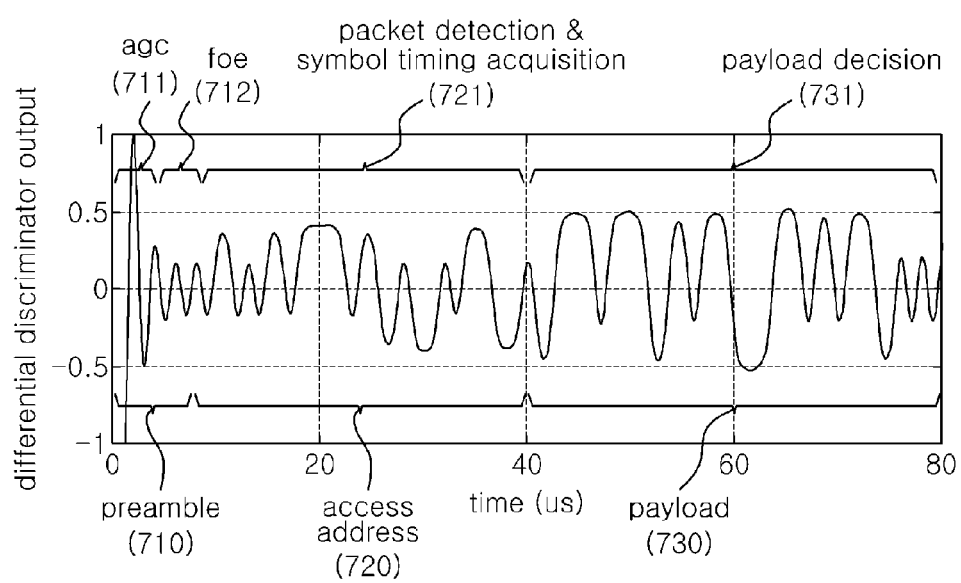
FIG. 7 is a diagram showing an example of a waveform observed at the output terminal of the differential discriminator of a Bluetooth signal receiving device according to an embodiment of the present invention.

FIG. 7 is a diagram showing an example of a waveform observed at the output terminal of the differential discriminator of a Bluetooth signal receiving device according to an embodiment of the present invention.

Referring to FIG. 7, the waveforms of a preamble interval 710, an access address interval 720, and a payload interval 730 are sequentially observed.

The operations of automatic gain control (agc) 711 and frequency offset estimation (foe) 712 are performed using a received preamble signal having a length of 8 μs before an access address and a protocol data unit are demodulated and identified. In particular, as shown in FIG. 7, a preamble interval 710 may be divided into a first half and a second half, and a first 4-μs interval may be used for the automatic gain control 711 and the remaining 4-μs interval may be used for the frequency offset estimation 712.

In the Bluetooth signal receiving device of the present invention, the overall access address interval 720 may be used for packet detection and symbol timing acquisition 721. Meanwhile, the overall preamble interval 710 may be used for the automatic gain control 711, the carrier frequency offset estimation 712 and a recovery process, and may be recovered to a waveform having quality appropriate for errorless bit demodulation. As sampling time available for the automatic gain control 711, the carrier frequency offset estimation 712 and the recovery process increases, the accuracy of the automatic gain control 711, the carrier frequency offset estimation 712 and the recovery process can increase and also the overall quality of a received signal can increase.

In the payload interval 730, payload determination 731 may be performed using the optimum symbol timing obtained during the process of the packet detection and symbol timing acquisition 721.

Generally, an interval having a receiving sensitivity equal to or higher than −70 dBm may be referred to as a "strong electric field," and an interval having a receiving sensitivity equal to or lower than −90 dBm may be referred to as a "weak electric field." In the weak electric field, the magnitude of noise appears high compared to that of a signal. A problem may arises in that when automatic gain control, frequency offset estimation, packet detection and timing offset estimation are all completed during the preamble interval 710 having a length of 8 μs, the accuracy of detection and estimation processes is degraded. To overcome the time problem, in the embodiment of FIG. 7, the information of an access address bit stream may be previously received from the link layer and the access address interval 720 having a length of 32 μs may be used as a pilot signal, in order to use the received signal of the "unknown" access address interval 720, having a length of 32 μs and received immediately after an agreed upon preamble, as an "agreed upon signal" in a physical layer. Intentionally, the accuracy of the estimation and the detection may be improved by the increased length of the pilot signal.

FIG. 7 shows an embodiment in which the packet detection and symbol timing acquisition 721 is performed only in the access address interval 720. In another embodiment of the present invention, part of the preamble interval 710 may be used for the initial process of packet detection and symbol timing acquisition (not shown). This modification may be used when the complexity of implementation needs to be decreased in packet detection compared to that of the embodiment of FIG. 7. In this case, the preamble interval 710 may be divided into a first half and a second half, and a first 4-μs interval may be used for the automatic gain control 711 and the frequency offset estimation 712 and the remaining 4-μs interval may be used for the packet detection. In the case of the packet detection using the second half of the preamble signal, a correlation metric between the received preamble signal having a form, such as that of the sine wave-like wave shown in FIG. 4, and a preamble waveform stored in the memory may be calculated, it may be recognized that a packet to be assigned to a device itself is present at the moment a value larger than a threshold value is output, and a symbol timing may be obtained based on the point at which the peak of the output value occurs.

Figure 8:
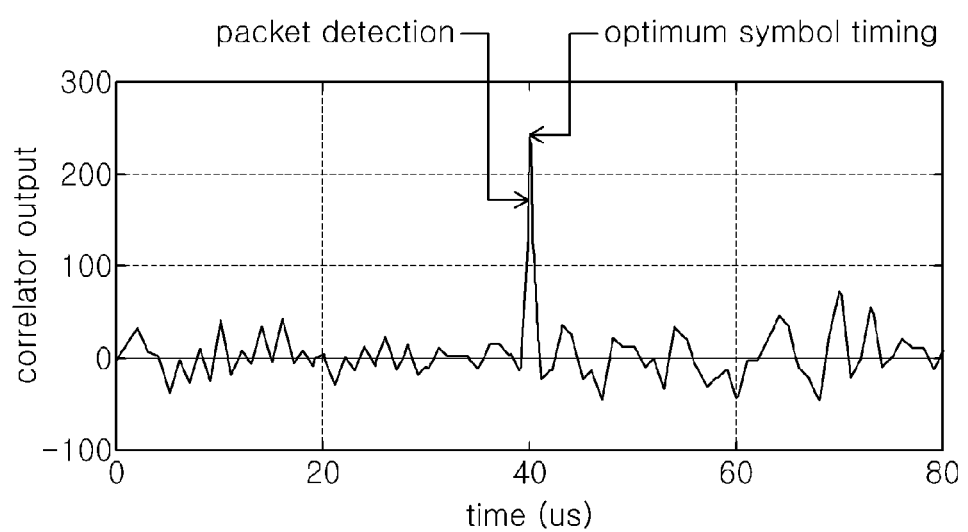
FIG. 8 is a diagram showing an example of a waveform observed at the output terminal of the correlator circuit of a Bluetooth signal receiving device according to an embodiment of the present invention.

FIG. 8 is a diagram showing an example of a waveform observed at the output terminal of the correlator circuit 540 of a Bluetooth signal receiving device according to an embodiment of the present invention.

The output waveform of the correlator circuit 540 will exhibit a peak value at the point at which a first reference signal determined from a received signal matches a second reference signal generated from a previously stored address bit stream. In this case, when the output waveform of the correlator circuit 540 exceeds a threshold value at a specific point, the Bluetooth signal receiving device recognizes that a packet assigned to itself has been received (packet detection). Thereafter, the Bluetooth signal receiving device tracks a peak value during symbol time, and acquires a timing indicative of a peak value as an optimum symbol timing. After the acquisition, a received protocol data unit signal is sampled at a corresponding sampling timing phase at symbol intervals in place of up-sampling time intervals, and an output bit stream having passed through the bit discriminator is transferred to the link layer.

Figure 9:
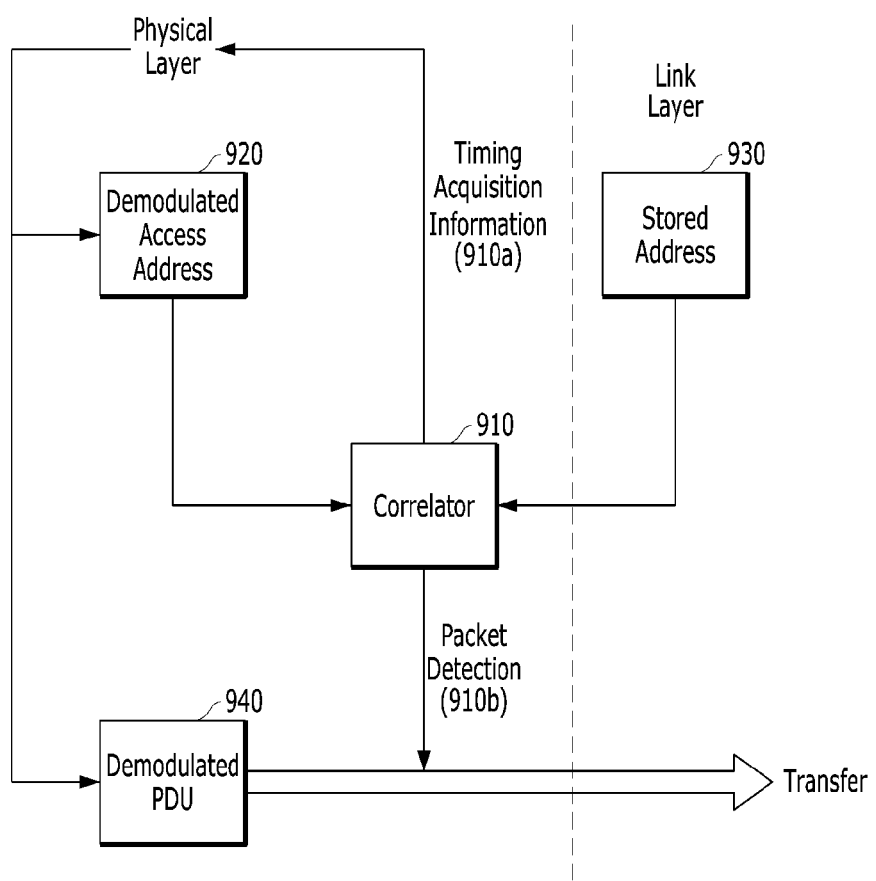
FIG. 9 is a diagram showing a cooperative relationship between the physical and link layers of a Bluetooth signal receiving device according to an embodiment of the present invention.

FIG. 9 is a diagram showing a cooperative relationship between the physical and link layers of a Bluetooth signal receiving device according to an embodiment of the present invention.

Referring to FIG. 9, an address 930 previously stored in a link layer is transferred to the correlator 910 of a physical layer.

In the typical Bluetooth standard, a physical layer performs packet synchronization by using a received preamble signal, generates a bit stream by demodulating an access address and a protocol data unit signal, and transfers the demodulated bit stream to a link layer. Furthermore, the link layer determines whether the access address bit stream received from the physical layer matches a previously stored master-slave link address, and recognizes that a packet assigned to its own device is present and receives a protocol data unit when the access address bit stream matches the master-slave link address, and discards the access address bit stream when the access address bit stream does not match the master-slave link address.

The present invention adopts a new paradigm that departs from the conventional scheme of transferring an access address bit stream from a physical layer to a link layer and that transfers an access address bit stream 930, previously agreed upon between devices, from a link layer to a physical layer in advance in a reverse manner. The physical layer performs packet detection 910b by using the access address bit stream 930, received from the link layer, for the calculation of a correlation with a received access address signal 920 (see 910). When a correlation value exceeds a threshold value, it is recognized that a packet assigned to its own device has been detected. In this case, when a packet is detected at step 910b, an optimum symbol timing is obtained by detecting the peak of the correlation of the detected packet, and symbol timing acquisition information 910a is shared by all the receiving devices of the physical layer. Since the physical layer detects the presence of the packet assigned to the corresponding receiving device, the physical layer transfers the information of a demodulated protocol data unit 940 to the link layer as a valid protocol data unit.

According to the present invention, correlation calculation time is increased from 4 µs to 32 µs (or 4 µs+32 µs) corresponding to the overall length of an access address by using a received access address signal in place of a received preamble signal for packet detection (alternatively, a received access address signal may be used along with a received preamble signal, and thus the magnitude of noise is reduced to a value that is ⅛ or less times the original magnitude due to an averaging effect, thereby achieving the effect of improving packet detection performance by 9 dB.

Figure 10:
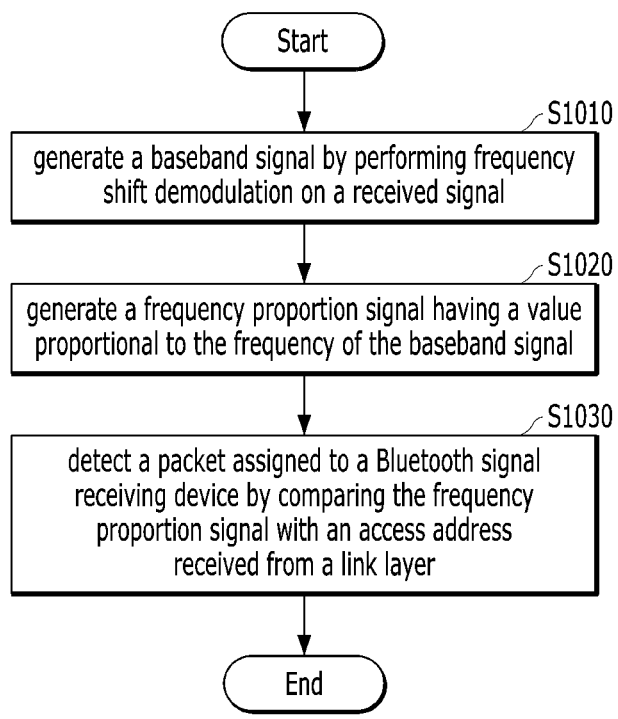
FIG. 10 is an operation flowchart showing the packet detection process of a Bluetooth signal receiving method according to an embodiment of the present invention.

FIG. 10 is an operation flowchart showing the packet detection process of a Bluetooth signal receiving method according to an embodiment of the present invention.

Referring to FIG. 10, the Bluetooth signal receiving method includes step S1010 of generating a baseband signal by performing frequency shift demodulation on a received signal. The Bluetooth signal receiving method includes step S1020 of generating a frequency proportion signal having a value proportional to the frequency of the baseband signal.

The Bluetooth signal receiving method includes step S1030 of detecting a packet assigned to the Bluetooth signal receiving device by comparing the frequency proportion signal with an access address received from a link layer.

At the packet detection step S1030, a correlation between the received frequency proportion signal and the access address may be obtained, and it may be recognized that the packet assigned to the Bluetooth signal receiving device has been received when the correlation exceeds a threshold value. In this case, the threshold value may be set such that the case where the correlation exceeds the threshold value corresponds to the case where the received frequency proportion signal is substantially identical to the access address. Furthermore, the threshold value may be designed by taking it into account that the received frequency proportion signal is not sampled at an optimum symbol timing and there may be an error in a sampling point. Alternatively, the threshold value may be designed by taking it into account that an up-sampled received signal is compared with an access address because an optimum symbol timing is not known.

FIG. 11 is an operation flowchart showing the packet detection and symbol timing acquisition process of a Bluetooth signal receiving method according to an embodiment of the present invention.

Referring to FIG. 11, the Bluetooth signal receiving method includes step S1110 of generating a baseband signal by performing frequency shift demodulation on a received signal. The Bluetooth signal receiving method includes step S1120 of generating a frequency proportion signal having a value proportional to the frequency of the baseband signal.

The Bluetooth signal receiving method includes step S1130 of detecting a packet assigned to a Bluetooth signal receiving device by comparing the frequency proportion signal with an access address received from a link layer.

The Bluetooth signal receiving method includes step S1140 of detecting the peak of the result output value of the comparison between the frequency proportion signal and the access address. The Bluetooth signal receiving method includes step S1150 of acquiring a symbol timing based on the detected peak.

The acquired symbol timing undergoes symbol time-based discrete time sampling and bit decision, and is used to generate a valid bit stream. The valid bit stream sampled and identified using the acquired symbol timing may be transferred from the physical layer to the link layer.

A Bluetooth device operates as a master or a slave, and a connection is performed based on a pair of a master and a slave. A link layer having received a bit stream demodulated by the physical layer of a receiver performs comparison with a previously agreed upon access address, recognizes that the bit stream is a valid packet assigned to its own device when there is a match, and converts a received protocol data unit into a link layer format. The present invention relates to a method that performs the comparison of a bit stream in a link layer, obtains a correlation with an up-sampled received signal in a physical layer, and uses an access address, used for a device recognition purpose, for packet synchronization calculation, thereby improving the performance of packet detection and symbol timing acquisition compared to a conventional method using a short preamble, and thus enabling a high-sensitivity receiver to be implemented.

A low-sensitivity receiver targeted at −70 dBm receiving sensitivity may be implemented using a low-complexity technique, such as a hard limiter. In contrast, a −90 dBm or lower high-sensitivity receiver uses a high-level calculation technique, such as a differential discriminator or an MLSE. Furthermore, to smoothly perform post-processing calculations, pre-processing calculations, such as automatic gain control, carrier offset estimation, symbol timing estimation, and packet detection calculations, must be performed in a region less than −90 dBm without error. The present invention is advantageous in that calculations concentrated in a short preamble interval can be effectively distributed by using an access address, used for a device recognition purpose in a link layer, as a pilot signal for packet detection and symbol timing acquisition in an up-sampling time region in a physical layer; is advantageous in that gain attributable to a noise averaging effect can be obtained by an access address considerably longer than a preamble in a time region, thus being suitable for a high-sensitivity receiver; and is advantageous in that the efficiency of calculation can be maximized by simultaneously performing packet detection and symbol timing acquisition functions.

The Bluetooth signal receiving method according to an embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

According to the present invention, correlation calculation time is increased from 4 µs to 32 µs corresponding to the overall length of an access address by using a received access address signal in place of a received preamble signal for packet detection, and thus the magnitude of noise is reduced to a value that is ⅛ or less times the original magnitude due to an averaging effect, thereby achieving the effect of improving packet detection performance by 9 dB.

According to the present invention, correlation calculation time is increased from 4 µs to 32 µs corresponding to the overall length of an access address by using a received access address signal in place of a received preamble signal for symbol timing acquisition, and thus the magnitude of noise is reduced to a value that is ⅛ or less times the original magnitude due to an averaging effect, thereby achieving the effect of improving packet detection performance by 9 dB.

According to the present invention, a preamble is not used for packet detection and symbol timing acquisition, and thus a longer time can be assigned to automatic gain control and various types of offset estimation using preamble, thereby improving the effect of improving the accuracy of estimation and recovery.

According to the present invention, a Bluetooth signal receiving device and method can be implemented that can perform packet detection and symbol timing acquisition at relatively high accuracy even in a low signal-to-noise power ratio environment and can also improve the accuracy of automatic gain control and various types of offset estimation by using a preamble.

According to the present invention, a Bluetooth signal receiving device and method can be implemented that can improve the efficiency and accuracy of packet detection and symbol timing acquisition through cooperation between a link layer and a physical layer.

While the present invention has been described in conjunction with specific details, such as specific elements, and limited embodiments and diagrams, above, these are provided merely to help an overall understanding of the present invention. The present invention is not limited to these embodiments, and various modifications and variations can be made based on the foregoing description by those having ordinary knowledge in the art to which the present invention pertains.

Therefore, the technical spirit of the present invention should not be determined based only on the described embodiments, and not only the following claims but also all equivalents to the claims and equivalent modifications should be construed as falling within the scope of the spirit of the present invention.

What is claimed is:

1. A Bluetooth signal receiving device for receiving a Bluetooth signal, the device comprising:
a discriminator circuit configured to:
generate a baseband signal by performing frequency shift demodulation on a received signal; and
generate a frequency proportion signal having a value proportional to a frequency of the baseband signal; and
a correlator circuit configured to detect a packet assigned to the Bluetooth signal receiving device by comparing the frequency proportion signal with an access address received from a link layer,
wherein the frequency proportion signal includes an up-sampled signal.

2. The Bluetooth signal receiving device of claim 1, further comprising a timing acquisition circuit configured to acquire a symbol timing of the frequency proportion signal by detecting a peak of an output of the correlator circuit.

3. The Bluetooth signal receiving device of claim 1, wherein the correlator circuit is further configured to:
generate an output value by comparing the frequency proportion signal with the access address received from the link layer; and
recognize that the packet assigned to the Bluetooth signal receiving device has been received when the output value is equal to or larger than a threshold value.

4. The Bluetooth signal receiving device of claim 1, wherein the correlator circuit comprises:
a sign decision circuit configured to generate a first reference signal by deciding signs of the frequency proportion signal;
memory configured to generate a second reference signal based on the access address received from the link layer; and
an output circuit configured to generate a correlation output by performing logical operations on the first and second reference signals and summing results of the logical operations.

5. The Bluetooth signal receiving device of claim 2, further comprising:
a discrete time sampler circuit configured to sample the frequency proportion signal based on the symbol timing; and
a bit discriminator circuit configured to:
generate a plurality of series of bit streams based on sampled values; and
transfer the plurality of series of bit streams to the link layer.

6. The Bluetooth signal receiving device of claim 1, wherein the access address received from the link layer is a master-slave link address of the Bluetooth signal receiving device.

7. The Bluetooth signal receiving device of claim 1, wherein the correlator circuit is further configured to detect the packet assigned to the Bluetooth signal receiving device by comparing the frequency proportion signal with the access address, received from the link layer, in an access address interval of Bluetooth.

8. A Bluetooth signal receiving method for a Bluetooth signal receiving device for receiving a Bluetooth signal, the method comprising:
generating a baseband signal by performing frequency shift demodulation on a received signal;
generating a frequency proportion signal having a value proportional to a frequency of the baseband signal; and
detecting a packet assigned to the Bluetooth signal receiving device by comparing the frequency proportion signal with an access address received from a link layer,
wherein the frequency proportion signal includes an up-sampled signal.

9. The Bluetooth signal receiving method of claim 8, further comprising:

detecting a peak of an output of a result of comparing the frequency proportion signal with the access address received from the link layer; and acquiring a symbol timing of the frequency proportion signal based on the detected peak.

10. The Bluetooth signal receiving method of claim 8, wherein the detecting comprises:

generating an output value by comparing the frequency proportion signal with the access address received from the link layer; and recognizing that the packet assigned to the Bluetooth signal receiving device has been received when the output value is equal to or greater than a threshold value.

11. The Bluetooth signal receiving method of claim 8, wherein the detecting comprises detecting the packet assigned to the Bluetooth signal receiving device by comparing the frequency proportion signal with the access address, received from the link layer, in an access address interval of Bluetooth.

* * * * *